United States Patent
Hsiao et al.

[11] Patent Number: 6,004,473
[45] Date of Patent: Dec. 21, 1999

[54] MAGNETIC WRITE HEAD HAVING A COIL WITH SUBMICRON PITCH

[75] Inventors: Richard Hsiao; Cherngye Hwang, both of San Jose; David John Seagle, Morgan Hill, all of Calif.

[73] Assignee: International Business Machines Corporation, Armonk, N.Y.

[21] Appl. No.: 08/876,157

[22] Filed: Jun. 13, 1997

[51] Int. Cl.$^6$ ........................................................ B44C 1/22
[52] U.S. Cl. ............................ 216/22; 216/72; 29/603.18
[58] Field of Search .................................. 216/22, 66, 72, 216/78; 29/603.18

[56] References Cited

U.S. PATENT DOCUMENTS

| | | | |
|---|---|---|---|
| 4,760,481 | 7/1988 | Yuito et al. | 360/123 |
| 4,838,994 | 6/1989 | Gulde et al. | 156/643 |
| 5,349,745 | 9/1994 | Kawabe et al. | 29/603 |
| 5,578,166 | 11/1996 | Hirota | 156/643.1 |

*Primary Examiner*—Bruce Breneman
*Assistant Examiner*—Shamim Ahmed
*Attorney, Agent, or Firm*—Gray Cary Ware Freidenrich

[57] ABSTRACT

A method is provided wherein first and second sacrificial layers of a write element in a merged magnetic head are provided on top of a coil material layer, wherein the first sacrificial layer serves as a mask for shaping the coil material layer into a write coil, and the second sacrificial layer is employed for patterning the desired shape of the first sacrificial layer. The second sacrificial layer is shaped by a first reactive ion etching (RIE) step through a spiral opening in a photoresist layer. The result is a spiral-shaped second sacrificial layer that is employed as a mask for a second RIE to etch the first sacrificial layer through a spiral opening in the second sacrificial layer. The remaining spiral-shaped first sacrificial layer is then employed as a mask for ion milling the coil material layer through a spiral opening in the first sacrificial layer resulting in a write coil with a submicron pitch and sloping edges, which together increase a width of the base of the coil for increased current inducting capability.

37 Claims, 9 Drawing Sheets

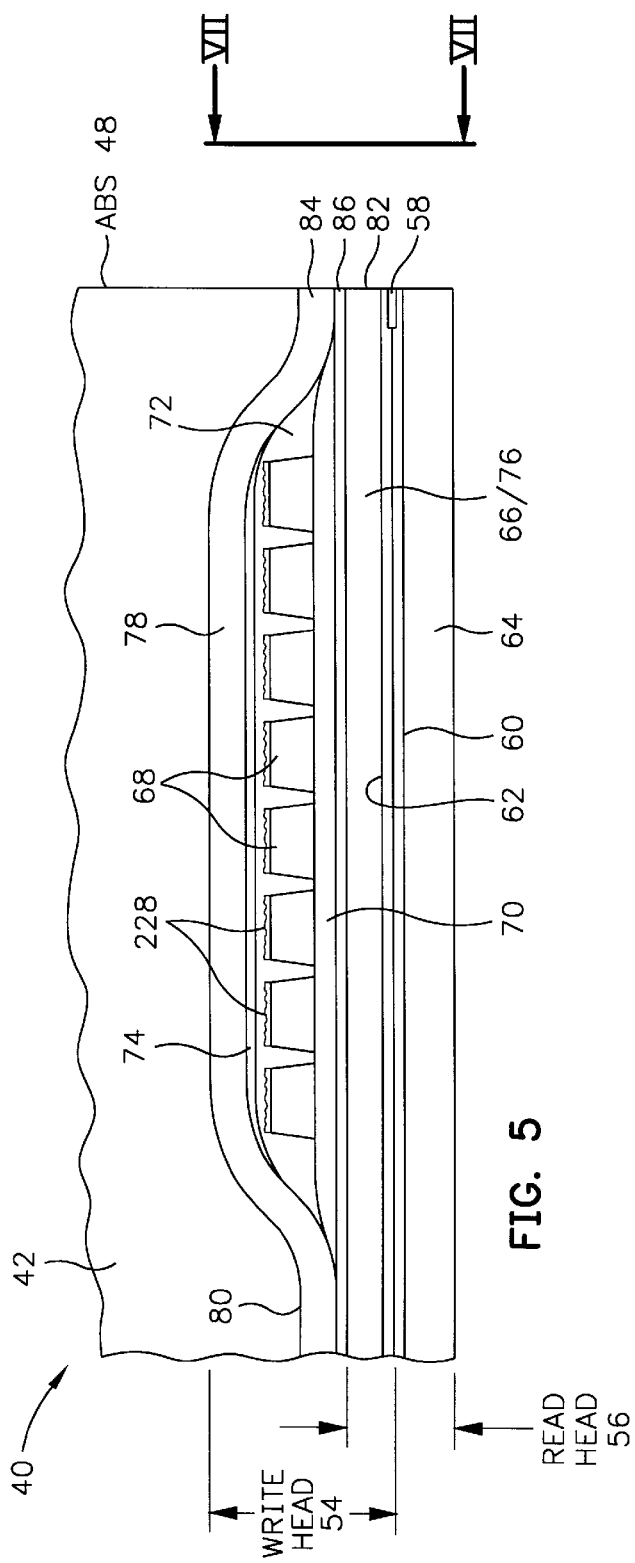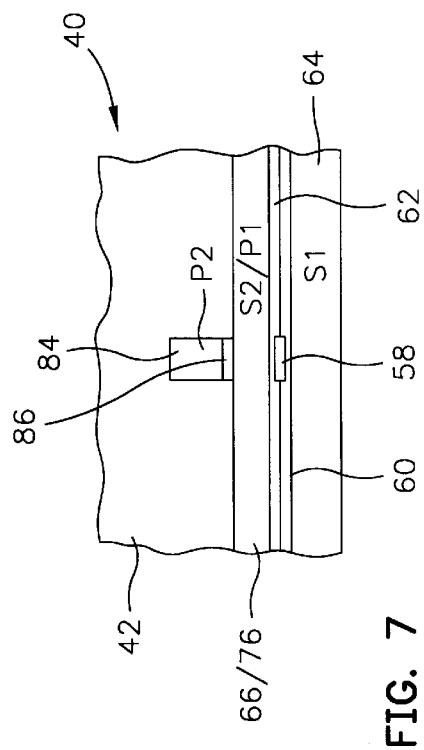

MAGNETIC WRITE HEAD HAVING A COIL WITH SUBMICRON PITCH

BACKGROUND OF THE INVENTION

1. Field of the Invention

The present invention relates to a write coil with a submicron pitch and more particularly to a write coil with submicron pitch, low profile and high write current conducting capability.

2. Description of the Related Art

A write head is typically combined with a magnetoresistive (MR) head to form a merged MR head which has sensitive elements exposed at an air bearing surface (ABS). The write head comprises first and second pole pieces that are connected at a back gap, the back gap being recessed from the ABS. The first and second pole pieces have first and second pole tips, each having first and second edges, the first and second edges terminating at the ABS. These edges are sensitive elements of the write head that are exposed at the ABS. An insulation stack, which comprises a plurality of insulation layers, is sandwiched between the first and second pole pieces, and a coil layer is embedded in the insulation stack. A processing circuit is connected to the coil layer for conducting information signal currents (write signals) through the coil layer. The write signals cause the coil to induce corresponding information signal fields on the first and second pole pieces. A magnetically insulative gap layer is sandwiched between the first and second pole tips so that the information signal fields fringe across the first and second edges of the first and second pole tips at the ABS. The read head includes an MR sensor sandwiched between first and second insulative gap layers. This sensor is the sensitive element of the read head that is exposed at the ABS. The first and second gap layers, and the MR sensor, are sandwiched between first and second shield layers. In a merged MR head, the second shield layer and the first pole piece are a common layer. The MR sensor detects magnetic fields of a rotating disk by a change in its resistance that corresponds to the strength of the magnetic fields. A sense current conducted through the MR sensor produces voltage changes that are received by the processing circuitry as readback signals. In a magnetic disk drive a magnetic disk is rotated adjacent to, and a short distance from, the ABS so that the write fields magnetize the disk along circular tracks, thereby storing information in the form of magnetized areas that can be detected by a read head.

There is a strong-felt need to minimize the size of the aforementioned components of the write head in order to increase the data rate of the head. Steps have been taken to reduce the length and thickness of the first and second pole pieces. This decreases the reluctance of the head, and supports higher frequency signals, which equate to higher data rates. Another component affecting the reluctance of the head is the write coil. Typically, the write coil includes one or more pancake-shaped coils stacked on top of each other, and separated by insulation layers. Steps have been taken to reduce the thickness and pitch of the write coil in order to improve the coil's frequency response. The pitch is the lateral spacing between adjacent coil lengths.

The write coil is typically constructed by frame plating. A seed layer is sputter deposited on top of a first insulation layer of the insulation stack. Photoresist is then spun on the seed layer, patterned by light, and then developed to leave a spiral-shaped opening where the coil is to be formed. Material, such as copper, is then electroplated in the opening to a desired height. The photoresist is then removed by a solvent, leaving one pancake-shaped coil. This method permits the coil to be constructed with desired heights, and with a close pitch. The primary problem with this coil is that the edge along its length is vertical, owing to the vertical side walls of the patterned photoresist. It is desirable that the bottom of the coil be flared outwardly, so as provide the write coil with increased write current capability, however, the method does not permit such flaring. Thus, the only way to increase write current with this method is to increase the height of the coil. Unfortunately, this increases the height of the insulation stack. A higher insulation stack causes the following problems: (1) a thicker photoresist layer is manifested in the pole tip region for constructing the second pole tip, which imposes a lower limit on track width; and (2) more light is reflected from the insulation stack into the photoresist layer in the pole tip region, resulting in jagged photoresist edges and a poorly formed second pole tip, after plating. Another problem is that the coil material is essentially limited to copper, since aluminum cannot be plated by this method. A further problem with this method is that plating is a wet process which is more difficult and expensive than the sputtering process that is discussed next.

Another method of making a write coil is to sputter, or plate, a coil material layer. If the coil layer is plated, a seed layer must first be sputter-deposited, followed by plating. Sputtering is a dry process; it may comprise conventional sputtering, or ion beam sputtering. In conventional sputtering, a work chamber contains a plasma ionized with material from a target for deposition on the workpiece. In ion beam sputtering, a gun within the chamber contains the plasma, and the gun directs the ionized plasma to the workpiece. A photoresist layer is then spun on the workpiece and patterned as described hereinabove. Ion milling, which is similar to sandblasting, is then employed to remove a portion of the coil material layer exposed by the patterned photoresist. The coil is finished after removal of the photoresist. A problem with this method is that ion milling results in redeposition on the side walls of the photoresist, which stays in place after removal of the photoresist. Redeposited material appears as a fence above the top of the coil, and it must be removed by some means, such as scrubbing. Another problem with this method is that, upon removing the photoresist, the first insulation layer below the coil, comprising hard baked photoresist, is exposed to the solvent employed for stripping the resist, and may be damaged thereby.

Still another method of constructing the write coil requires a modification of the aforementioned ion milling process, in which a sacrificial layer is formed on top of the coil material layer. Photoresist is patterned on top of the sacrificial layer, and then the sacrificial layer is reactively ion etched (RIE) through a spiral opening in the photoresist, leaving a coil of the sacrificial layer on top of the coil material layer, where the coil material is to remain. The coil material layer is then milled with an ion beam through a spiral opening that extends through the sacrificial layer, down to the first insulation layer. The sacrificial layer can then be left in place, or removed by a reactive ion etch that is fashioned not to attack the coil. We experimented with this method employing Ta as the sacrificial layer. Because of the thickness of the Ta required to be sacrificed during the ion milling step, the Ta layer was relatively thick. This then required that the photoresist employed for shaping the Ta be relatively thick, because of its consumption during the RIE step. During the light exposure step, the scattering of light increased with increased photoresist depth, causing a loss of definition and making it impossible to obtain a coil with a submicron pitch. Another problem with this method was redeposition of material milled from the sacrificial layer on the side walls of the coil. A further problem was that the angle of the ion milling beam to a normal to the plane of the coil material layer was limited because of the shadowing of the relatively high sacrificial layer. This then limited the expansion of the base of the coil layer for the purpose of increasing its write current capacity.

SUMMARY OF THE INVENTION

The present method employs first and second sacrificial layers, the first sacrificial layer being on top of the coil material layer and the second sacrificial layer being on top of the first sacrificial layer. It is important that the first sacrificial layer have a lower ion milling rate than the second sacrificial layer. The first sacrificial layer can be thinner than the aforementioned prior art Ta sacrificial layer allowing the angle of the ion milling to be increased to increase the width of the base of the coil. The second sacrificial layer, which may be Ta, is shaped by a first RIE through a spiral opening in the photoresist. The spiral shaped second sacrificial layer is then employed as a mask, and a second RIE is employed to etch the first sacrificial layer through the spiral opening in the second sacrificial layer. A spiral shaped first sacrificial layer, which may still have some of the first sacrificial layer, remains and may be employed as a mask for ion milling the coil material layer through a spiral opening in the first sacrificial layer. During ion milling, any remaining second sacrificial material is milled away, and nearly all of the first sacrificial layer is milled away when the coil material is finally milled into a coil. The remaining portion of the first sacrificial layer may be left in place in a completed head, or removed by RIE milling, as desired. In a preferred embodiment, the remaining portion of the first sacrificial layer is not removed in order to save a processing step and to prevent overmilling the coil. A preferred material for the first sacrificial layer is carbon. The first RIE is preferably fluorine-based, so that the Ta is removed, and the second RIE is preferably oxygen-based, so that the carbon is removed. Ta is not removed by the second RIE when it is oxygen-based, which means that the Ta layer can be very thin. This then means that the patterned photoresist layer can be thin for good definition of the Ta layer which, in turn, outlines the first sacrificial layer with good definition which, in turn, outlines the coil with good definition.

The present invention provides a method of constructing a write coil layer wherein: (1) the base of the coil can be maximized to increase its capacity to conduct write current; (2) other materials such as Al or Au can be employed for the write coil material; (3) a dry process, namely sputtering and ion milling, can be employed through the construction of the coil layer; (4) the coil layer can be built with a lower profile, which lowers the topography of the insulation stack, and thereby enables construction of a second pole tip with improved definition; (5) a submicron pitch is obtainable; (6) the coil is not constructed with a fence, nor is there any redeposition of any material from a sacrificial layer onto the edges of the coil; and (7) the first insulation layer is not subjected to a solvent when a photoresist layer is stripped.

An object of the present invention is to provide a method of making a write coil with a submicron pitch.

Another object is to provide a method of making a write coil entirely with a dry process.

A further object is to provide a method of making a write coil, wherein the base of the coil can be maximized to increase its capacity to conduct write current;

Still another object is to provide a method of making a write coil wherein materials, such as Al or Au can be employed for the write coil material;

Still a further object is to provide a method of making a write coil layer with a lower profile which, in turn, lowers the topography of an insulation stack which, in turn, enables construction of a second pole tip with improved definition;

Yet another object is to provide a method of making a write coil that is not constructed with a fence or redeposition of any material from a sacrificial layer onto the edges of the coil;

Yet a further object is to provide a method of making a write coil wherein a first insulation layer is not subjected to a solvent when a photoresist layer is stripped.

Other objects and attendant advantages of the invention will be appreciated upon reading the following description taken together with the drawings.

BRIEF DESCRIPTION OF THE DRAWINGS

FIG. 5 is a partial view of the slider and magnetic head as seen in plane V—V of FIG. 2;

FIG. 7 is a partial ABS view of the slider taken along plane VII—VII to show the read and write elements of the magnetic head;

DESCRIPTION OF THE PREFERRED EMBODIMENT

Figure 1:
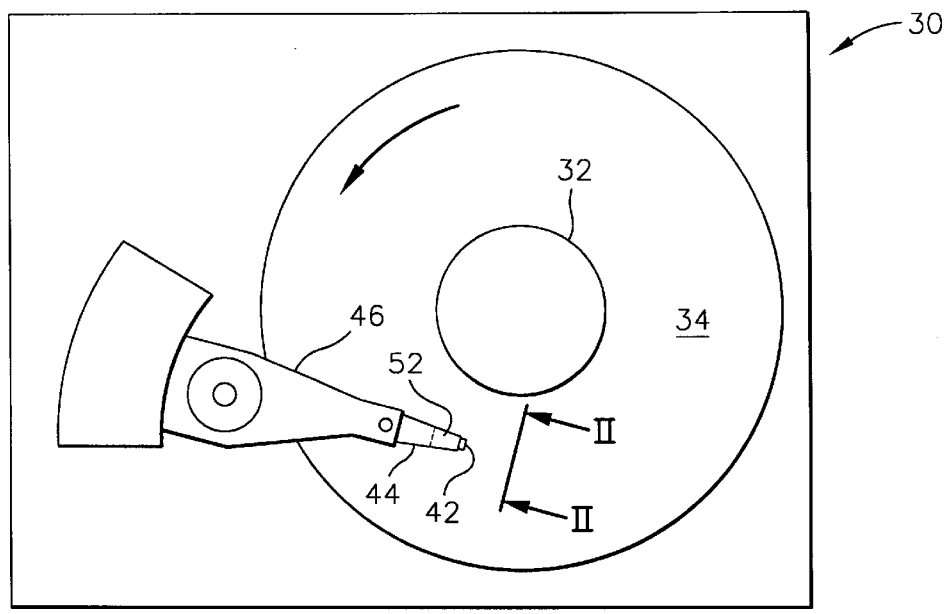
FIG. 1 is a planar view of an exemplary magnetic disk drive.
Figure 2:
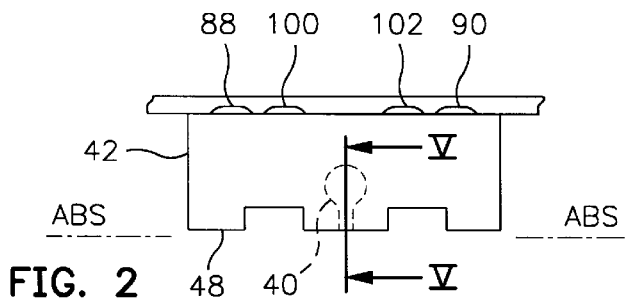
FIG. 2 is an end view of a slider with a magnetic head of the disk drive as seen in plane II—II.
Figure 3:
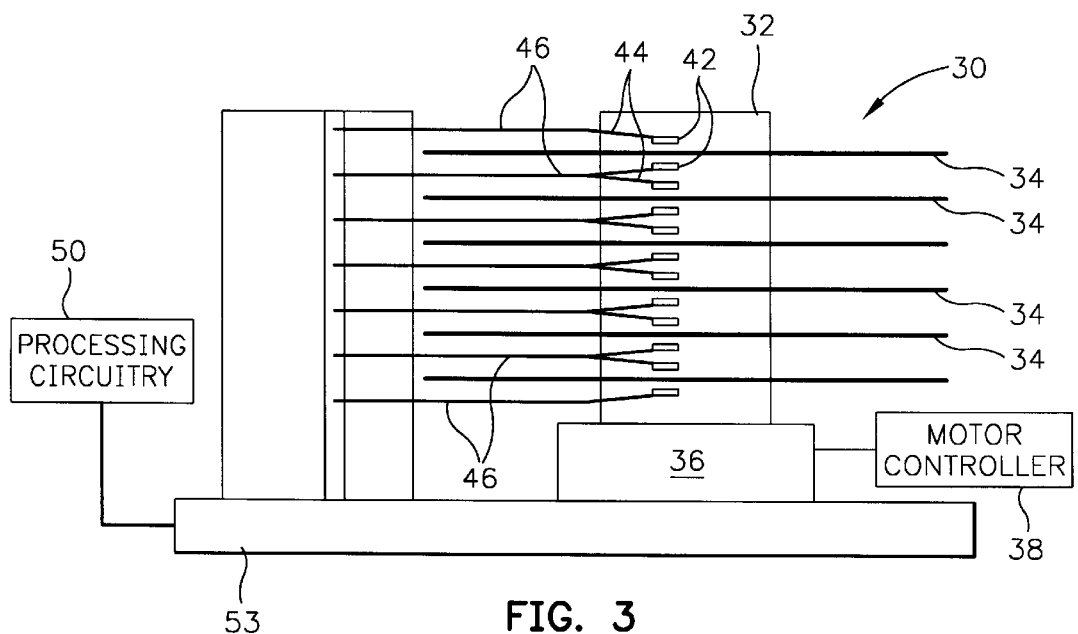
FIG. 3 is an elevation view of the magnetic disk drive wherein multiple disks and magnetic heads are employed.
Figure 4:
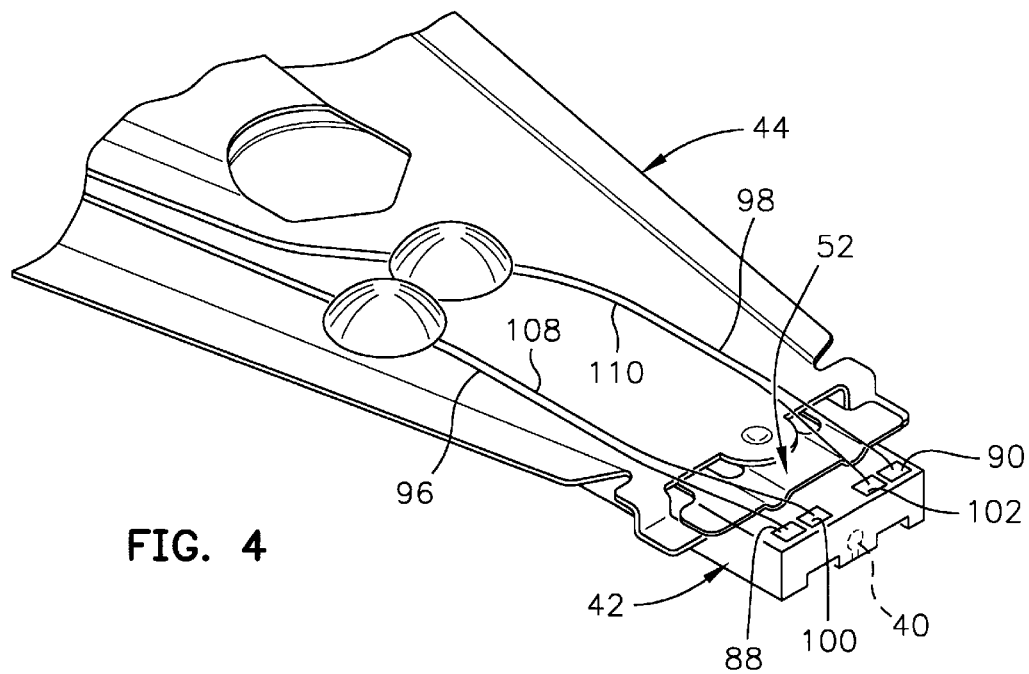
FIG. 4 is an isometric illustration of an exemplary suspension system for supporting the slider and magnetic head.

Referring now to the drawings wherein like reference numerals designate like or similar parts throughout the several views there is illustrated in FIGS. 1–3 a magnetic disk drive 30. The drive 30 includes a spindle 32 that supports and rotates a magnetic disk 34. The spindle 32 is rotated by a motor 36 controlled by a motor controller 38. A horizontal combined magnetic head 40, for reading and recording, is mounted on a slider 42. The slider 42 is supported by a suspension 44 and actuator arm 46. A plurality of disks, sliders and suspensions may be employed in the large capacity direct access storage device (DASD) shown in FIG. 3. The suspension 44 and actuator arm 46 position the slider 42 to place the magnetic head 40 in a transducing relationship with a surface of the magnetic disk 34. When the disk 34 is rotated by the motor 36, the slider is supported on a thin (typically, 0.05 µm) cushion of air ("air bearing") by the air bearing surface (ABS) 48. The magnetic head 40 may then be employed for writing information to multiple circular tracks on the surface of the disk 34, as well as for reading information therefrom. Processing circuitry 50 exchanges signals representing such information with the head 40, provides motor drive signals, and also provides control signals for moving the slider to various tracks. In FIG. 4 the slider 42 is shown mounted to a head gimbal assembly (HGA) 52 which, in turn, is mounted to the suspension 44. All of the above components are supported on a base 53.

FIG. 5 is a side cross-sectional elevation view of a merged magnetoresistive (MR) head 40 having a write head portion 54 and a read head portion 56. The read head portion includes an MR sensor 58. The MR sensor 58 is sandwiched between first and second gap layers 60 and 62 that are, in turn, sandwiched between first and second shield layers 64 and 66. In response to external magnetic fields, the resistance of the MR sensor 58 changes. A sense current conducted through the sensor causes these resistance changes to be manifested as potential changes. These potential changes are then processed by the processing circuitry 50 shown in FIG. 3.

Figure 6:
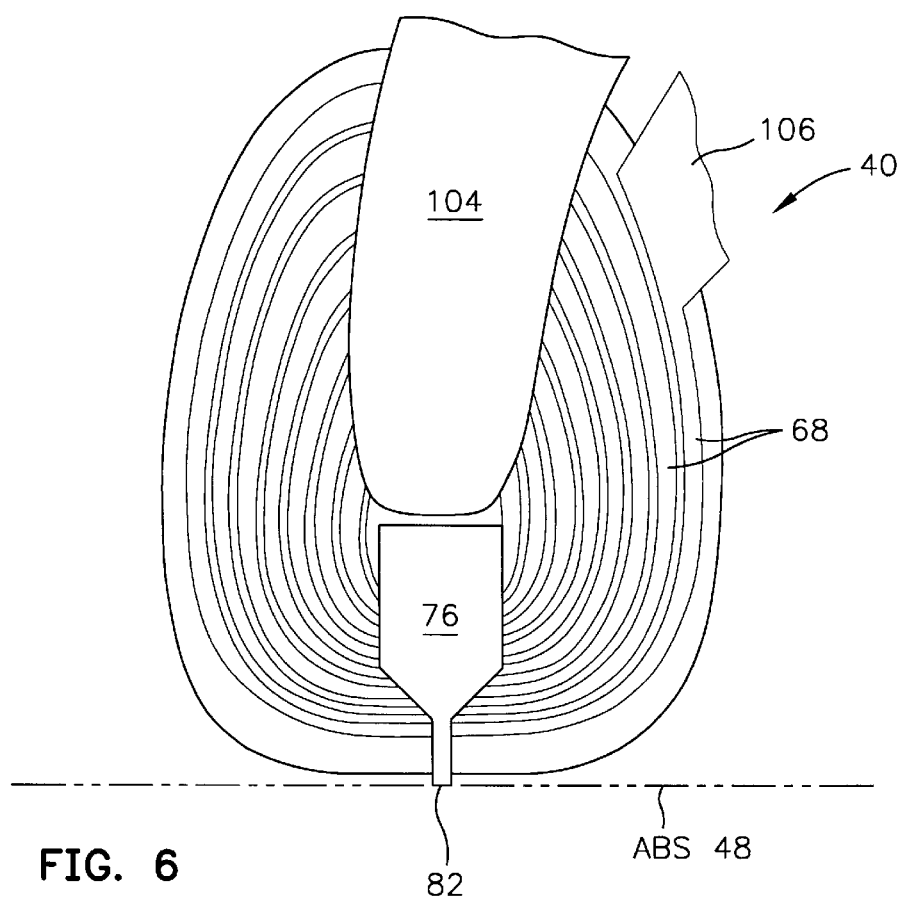
FIG. 6 is a view taken along plane VI—VI of FIG. 5 with all material above the second pole piece removed.

The write head portion 54 of the head includes a coil layer 68 sandwiched between first and second insulation layers 70 and 72. A third insulation layer 74 may be employed for planarizing the head to eliminate ripples in the second insulation layer caused by the coil layer 68. The first, second and third insulation layers are referred to in the art as an "insulation stack". The coil layer 68, and the first, second and third insulation layers 70, 72 and 74 are sandwiched between first and second pole piece layers 76 and 78. The first and second pole piece layers 76 and 78 are magnetically coupled at a back gap 80, and have first and second pole tips 82 and 84 that are separated by a gap layer 86 at the ABS. As shown in FIG. 2, first and second solder connections 88 and 90 connect leads (not shown) from the MR sensor 58 to leads 96 and 98 on the suspension 44, and third and fourth solder connections 100 and 102 connect leads 104 and 106 from the coil 68 (see FIG. 6) to leads 108 and 110 on the suspension.

Figure 8:
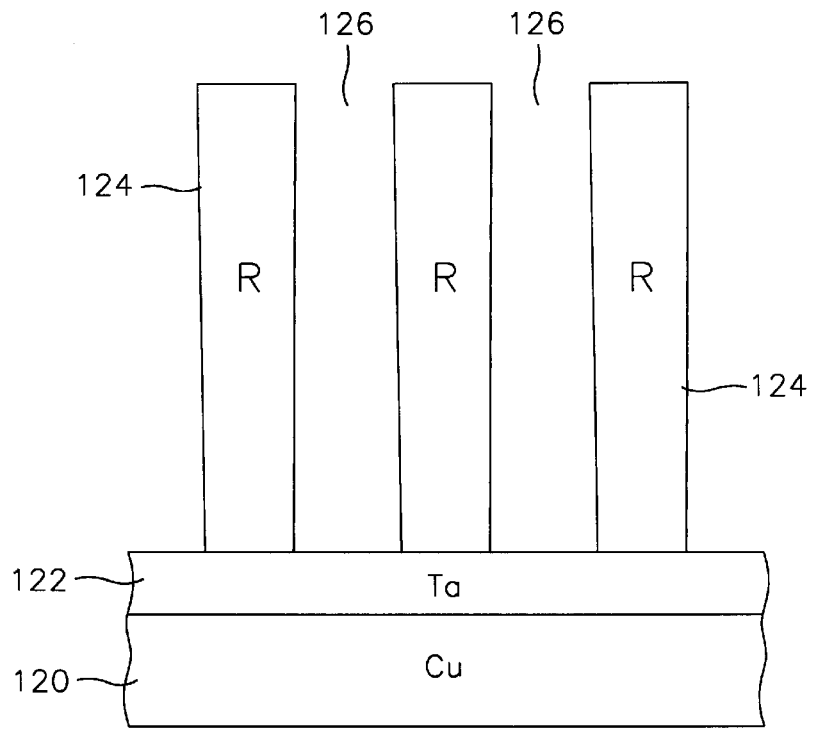
FIG. 8 is a schematic elevational view of a photoresist step employed in a prior art method of making a write coil.
Figure 9:
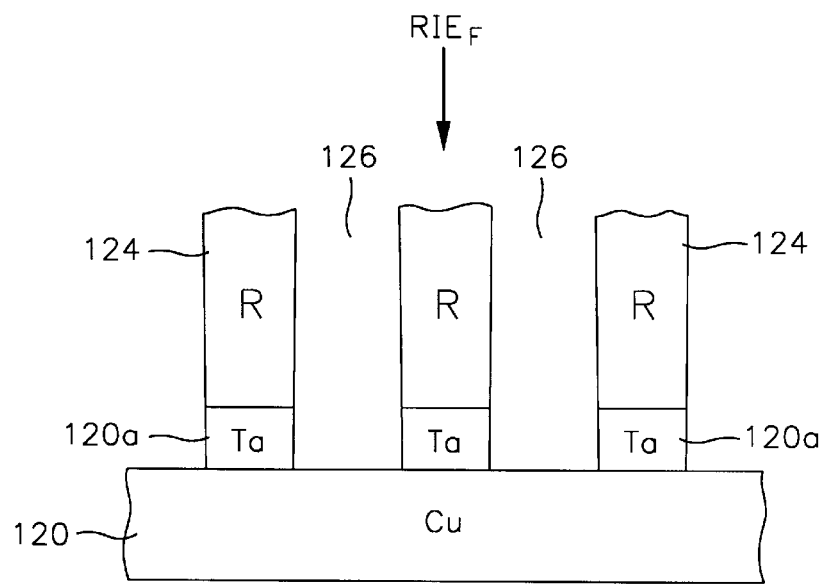
FIG. 9 is an RIE step in the prior art method.
Figure 10:
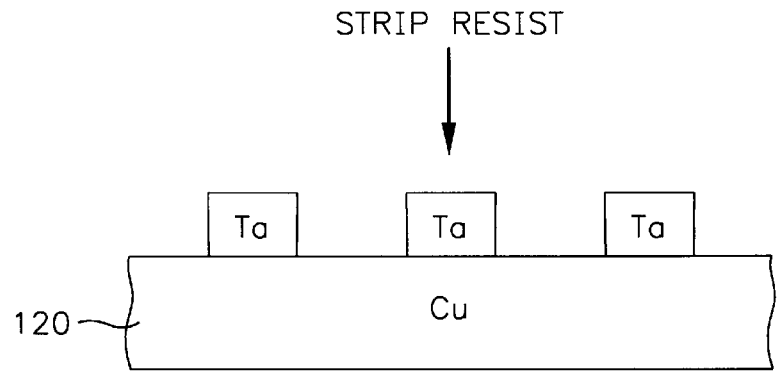
FIG. 10 is a resist removal step in the prior art method.
Figure 11:
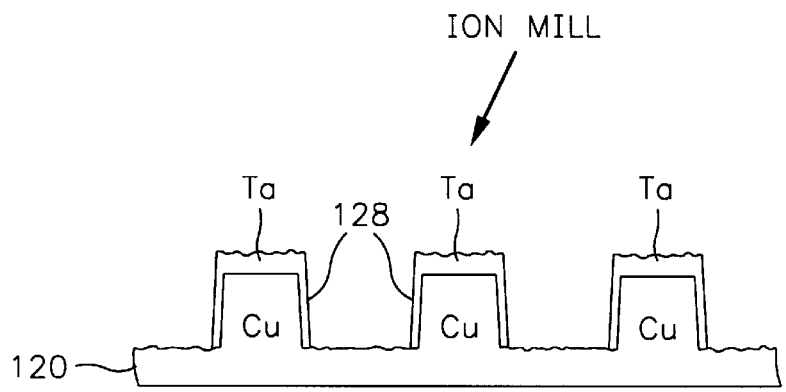
FIG. 11 is an ion milling step of the prior art method wherein the write coil is partially completed.

FIGS. 8–13 show a series of steps in a prior art method of constructing a write coil. In FIG. 8 a copper material layer 120 is deposited by plating or sputter deposition on a first insulation layer (see 70 in FIG. 5). A sacrificial layer, such as Ta, 122 is sputtered on top of the layer 120, and a photoresist layer 124 is spun on top of the sacrificial layer 122. The photoresist layer 124 is patterned with light, and is developed, resulting in the configuration shown in FIG. 8, which includes a spiral opening 126. If the copper layer 120 is 1 µm thick, the tantalum layer 122 should be approximately 0.6 µm thick for a subsequent ion milling step to shape the copper layer 120 into a write coil. If the tantalum layer 122 is 0.6 µm thick, the photoresist should be approximately 4.5 µm thick for patterning the tantalum layer 122. In FIG. 9 fluorine-based reactive ion etching ($RIE_F$) is employed to remove the tantalum exposed within the spiral opening 126 of the photoresist layer 124. This produces a spiral shaped tantalum layer 120A similar to the spiral shown in FIG. 6. The remaining photoresist, shown in FIG. 9, desirably ensures complete removal of the tantalum material exposed by the spiral space 126. In FIG. 10 the remainder of the photoresist is stripped by $RIE_F$, or by a solvent. The tantalum layer now serves as a mask for ion milling the copper material layer 120, as shown in FIG. 11. FIG. 11 is an intermediate milling step showing a portion of the tantalum material being redeposited at 128 on the side walls of the partially completed coil.

Figure 12:
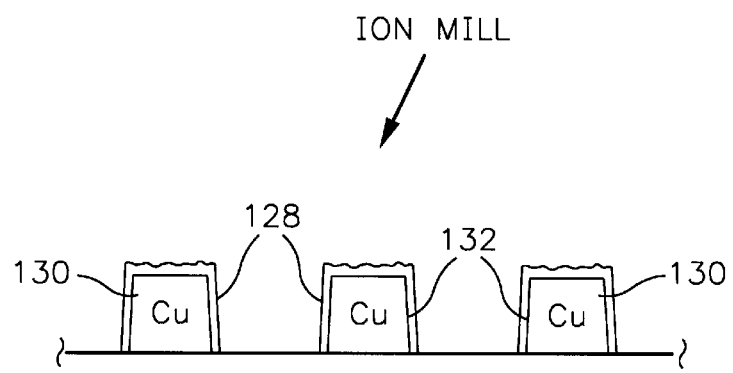
FIG. 12 shows completion of the ion milling step in making the write coil.

FIG. 12 shows completion of ion milling resulting in a final write coil 130 which has tantalum redeposited thereon. The high profile of the resist layer 124 in FIG. 8 results in poor definition of the resist at its base where the tantalum layer 122 is located. This prevents the prior art process from making write coils with a submicron pitch. This is due to scattering of light by the photoresist, in much the same way that light scatters as it penetrates a column of water. The thickness of the tantalum layer, shown in FIG. 10, is fashioned to ensure that the ion milling steps in FIGS. 11 and 12 completely remove the exposed copper material. The thickness of the tantalum layer 122 in FIG. 8 then dictates the height of the resist layer 124. A thick resist layer 124 limits the pitch of the write coil, because of the aforementioned light scattering problem. Another problem with the prior art method is that the angle of the ion milling to a normal to the plane of the coil material layer in FIG. 12 is limited, because of the height of the tantalum layer in FIG. 10. This results in a limitation of the extent to which the base of the write coil can be widened, as shown in FIG. 12. It would be desirable if the pitch could be decreased and the base could be wider than that produced by this prior art method.

Figure 13:
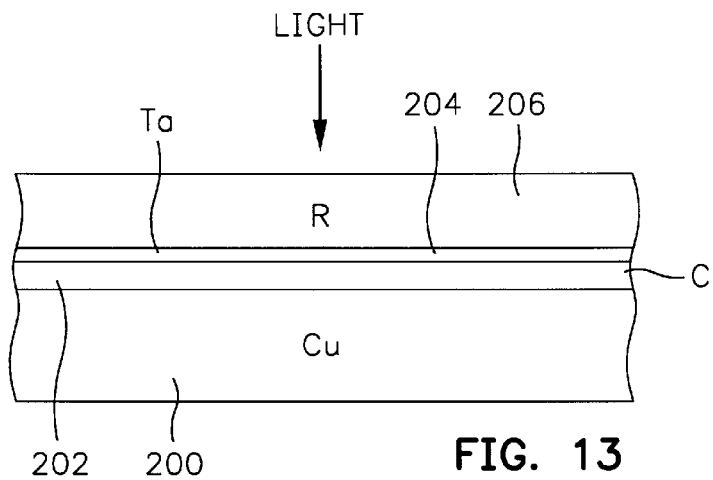
FIG. 13 is a schematic elevational view of a photoresist step in the making of a write coil according to the present invention.
Figure 14:
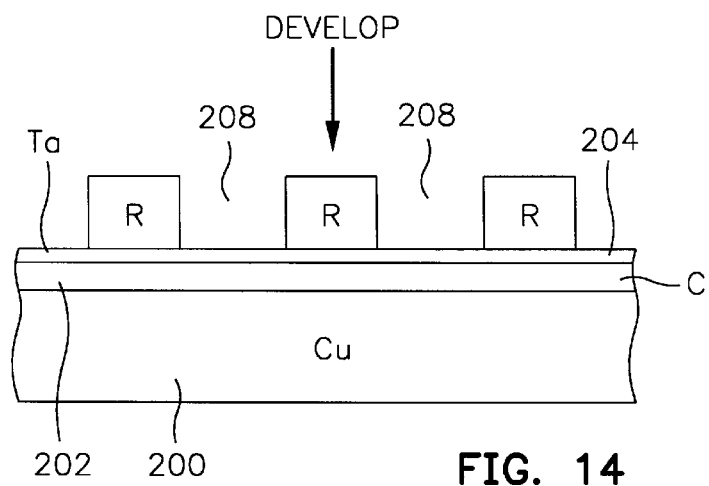
FIG. 14 is a step in patterning the photoresist.
Figure 15:
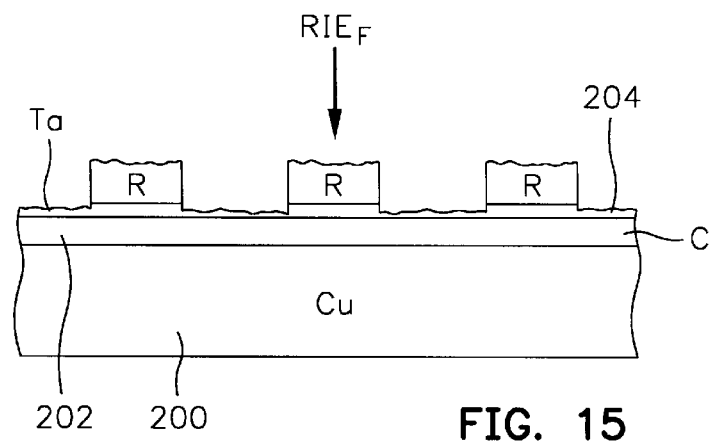
FIG. 15 is a $RIE_F$ step partially shaping a second sacrificial layer for the construction of the write coil.
Figure 16:
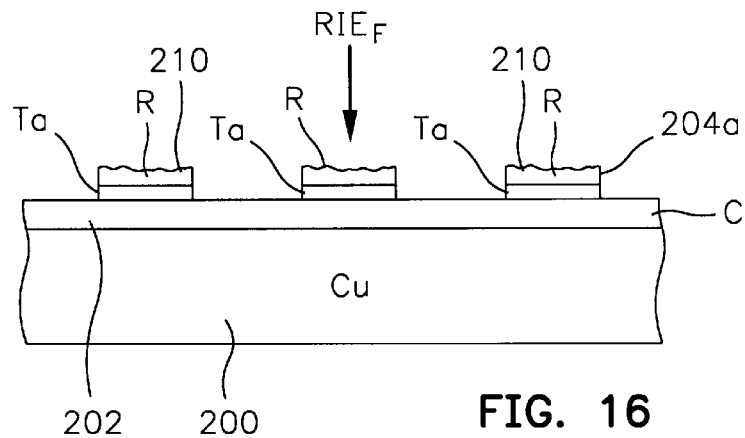
FIG. 16 shows continuation of the $RIE_F$ step completing shaping of the second sacrificial layer.
Figure 17:
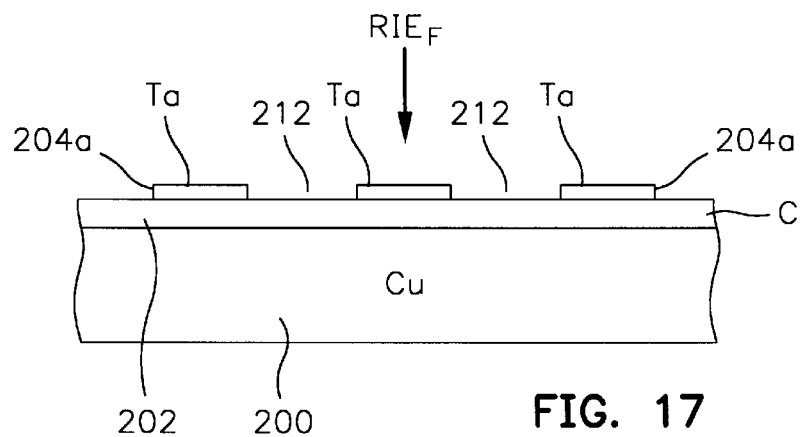
FIG. 17 shows continuation of the $RIE_F$ step removing any remaining photoresist.
Figure 18:
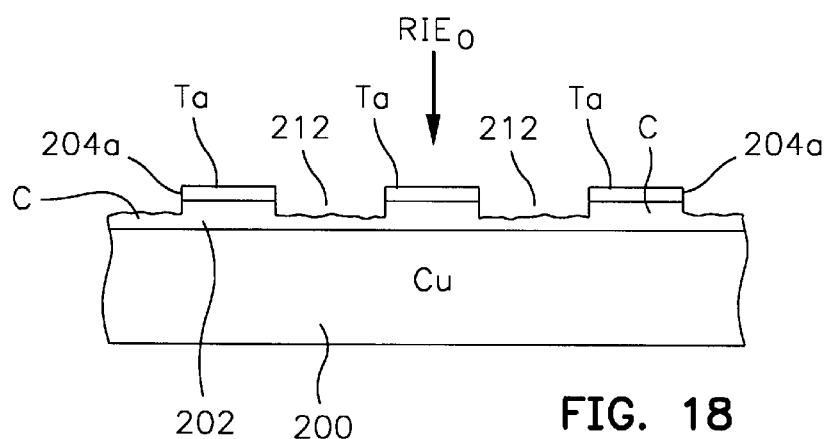
FIG. 18 is an $RIE_O$ step shaping the first sacrificial layer employed in the construction of the write coil.
Figure 19:
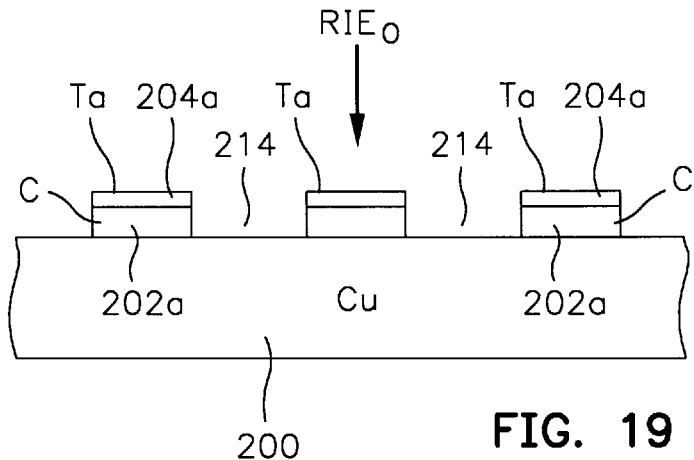
FIG. 19 is the completion of the $RIE_O$ step which completes the shaping of the first sacrificial layer.
Figure 20:
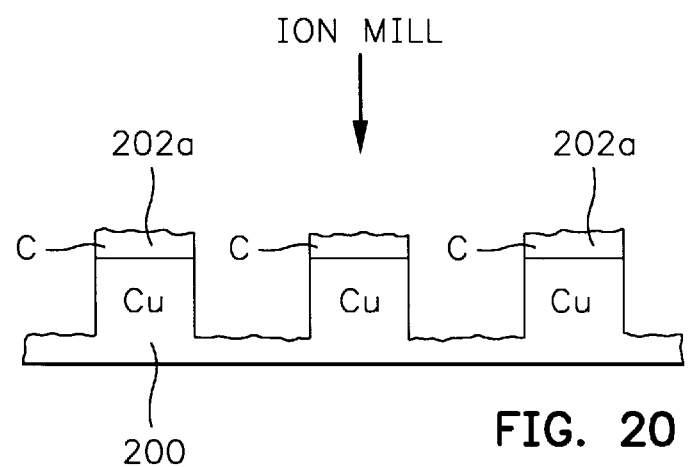
FIG. 20 is an ion milling step which has partially milled the coil material layer for defining the write coil.
Figure 21:
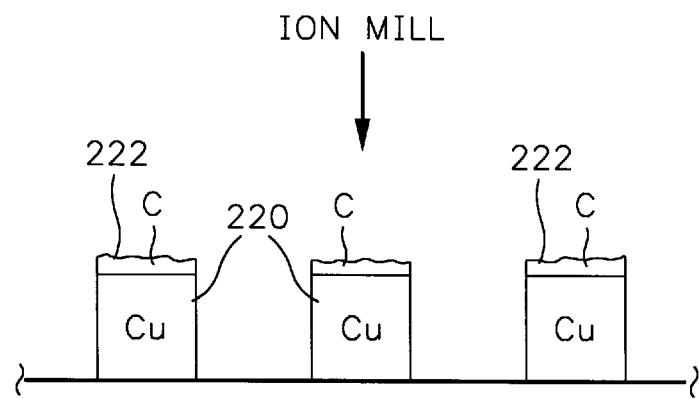
FIG. 21 is an optional completion of the ion milling step wherein the coil material layer has been completely milled to define the desired write coil but has a small amount of the first sacrificial material thereon.
Figure 22:
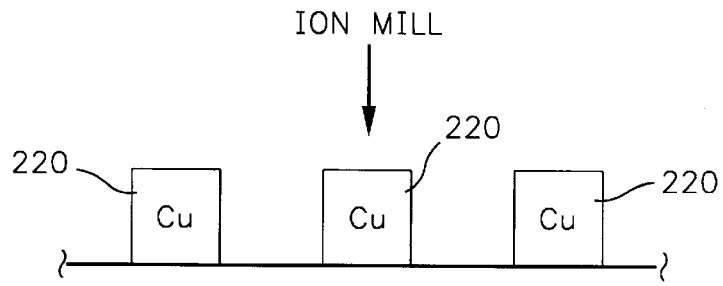
FIG. 22 is an optional additional ion milling step to mill away portions of the first sacrificial layer on top of the write coil.

The present method is shown in FIGS. 13–25. As shown in FIG. 13, a write coil material layer 200 is formed, preferably by sputter deposition. Next, a first sacrificial layer 202 is formed, preferably by sputter deposition, on the layer 200. The first sacrificial layer 202 is, preferably, carbon. A second sacrificial layer 204 is formed, preferably by sputter deposition, on the first sacrificial layer 202. The second sacrificial layer 204 is, preferably, tantalum. The milling rate of carbon is about one-half that of tantalum, which means that the first sacrificial layer 202 can be about one-half the thickness of the sacrificial layer 122 of the prior art method in FIG. 8. This reduced thickness in large part produces the advantages of the present invention. The tantalum layer 204 can be extremely thin, such as 0.1 μm. A very thin photoresist layer 206 is spun on top of the tantalum layer 204. Since the thickness of the tantalum layer is only 0.1 μm, the photoresist layer 206 need only be about 0.7 μm high, in order to pattern the tantalum layer 204, as compared to a 4.5 μm thick photoresist layer 124 in the prior art shown in FIG. 8. In FIG. 14 the photoresist layer 206 is patterned by light, and is developed to produce the spiral opening 208, which exposes a spiral portion of the tantalum layer 204 that is to be removed. In FIG. 15 $RIE_F$ is employed to remove unwanted exposed portions of the tantalum layer 204 which also progressively removes the photoresist layer 206. In FIG. 16 the $RIE_F$ has completed patterning the second sacrificial layer into a spiral configuration 204A, with small portions of the photoresist layer remaining, shown at 210. The $RIE_F$ may be continued, as shown in FIG. 17, to completely remove the photoresist portions 210, or these portions may be removed by an oxygen process. The second sacrificial layer 204A now has a spiral opening 212 that will be employed for patterning the first sacrificial layer 202. Oxygen based reactive ion etching ($RIE_O$) is then employed in FIG. 18 to remove the first sacrificial layer 202 exposed by the spiral opening 212 of the second sacrificial layer 204A, the step shown in FIG. 18 being an intermediate step in the $RIE_O$ process. In FIG. 19, the $RIE_O$ process is continued until the first sacrificial layer is patterned in the form of a spiral 202A. The first sacrificial layer 202A has a spiral opening 214 which exposes coil material that is to be removed. In FIG. 20 the exposed copper material is milled with an ion beam that is directed perpendicularly to a plane of the coil material layer, the milling step shown in FIG. 20 being an intermediate step in the milling process. In FIG. 21 the milling process is completed, leaving a finished write coil 220 that may have a portion 222 of the first sacrificial layer thereon, thereby ensuring completion of the depth of the coil. In a preferred embodiment, the portion 222 of the first sacrificial layer, which is now of minimal thickness, is left on top of the coil, and in the final magnetic head. If desired, however, the ion milling may be continued, as shown in FIG. 22, to remove the remaining portion 222 of the first sacrificial layer.

Figure 23:
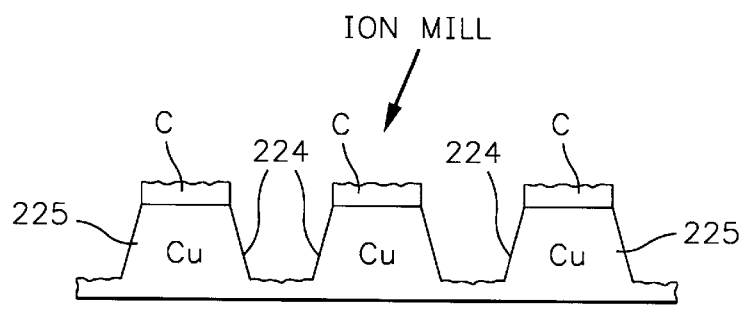
FIG. 23 is an optional step for the step shown in FIG. 20 wherein ion milling is directed at an angle to partially widen the base of the write coil.
Figure 24:
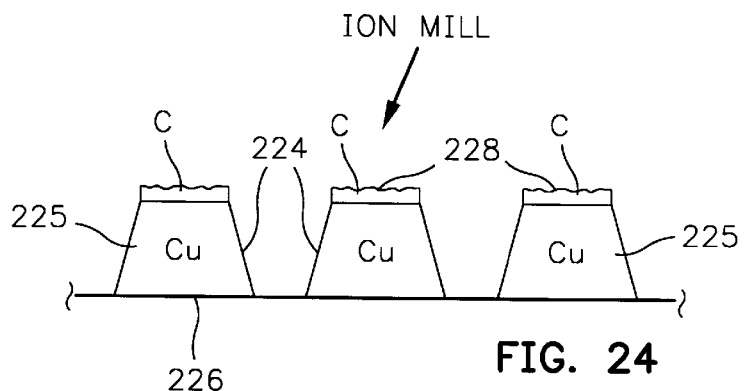
FIG. 24 shows continuation of the ion milling step wherein the base of the coil has been completed.
Figure 25:
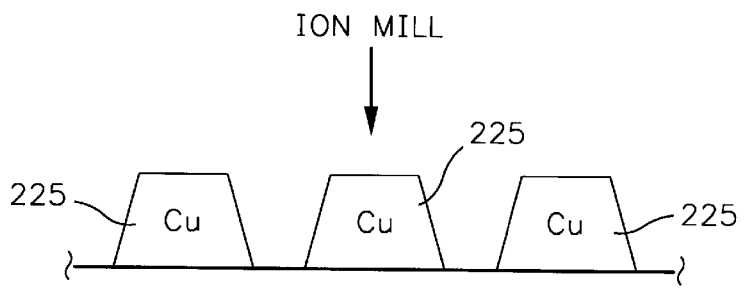
FIG. 25 is an optional step wherein any portion of the first sacrificial layer has been removed.

An advantage of the present invention is that ion milling can be performed at an increased angle to a normal to the plane of the coil material layer, as shown in FIG. 23, in order to decrease the slope of the side walls 224 of the write coil 225, the ion milling process in FIG. 23 being an intermediate step. FIG. 24 shows completion of the ion milling step, and completion of the side walls 224, resulting in a wider base 226 than heretofore obtainable in the prior art. At completion of ion milling in FIG. 24, a portion 228 of the first sacrificial layer is left on top of the coil layer in the preferred embodiment. If desired, this layer can be completely removed by further ion milling, as shown in FIG. 25.

It should be noted that the thin resist layer 206, in FIGS. 13 and 14, enables the photoresist to be well-defined by the light and developing step. This, in turn, allows the second sacrificial layer to be well-formed which, in turn, allows the first sacrificial layer to be well-formed. This then permits the construction of a write coil with a submicron pitch and with sloping side walls, which increases the capability of the coil to conduct write current. Further, the present invention enables the write coil to be constructed completely by a dry process of sputtering, RIE, and ion milling.

The preferred materials are copper for the write coil material layer, carbon for the first sacrificial layer, and tantalum for the second sacrificial layer. The ion milling rate of copper is 1200 Å/min, 400 Å/min for tantalum, and 200 Å/min for carbon. The typical etching and milling rates for the various materials, including photoresist, are shown in the table hereinbelow. These rates are somewhat dependent upon process settings.

TABLE

| Material | Etch Rate ($RIE_F$) | Etch Rate ($RIE_O$) | Milling Rate (Ion Milling) |
| --- | --- | --- | --- |
| Resist | 5 × Ta | 1000 Å/min | 600 Å/min |
| Ta | 200 Å/min | 0 | 400 Å/min |
| C | 300 Å/min | 1000 Å/min | 200 Å/min |
| Cu | 0 | 0 | 1200 Å/min |

It should be noted from the table that, when carbon is used as the first sacrificial layer and tantalum is used as the second sacrificial layer, the second sacrificial layer of tantalum is not etched by $RIE_O$, while the first sacrificial layer of carbon is etched by $RIE_O$. As can be seen during the $RIE_F$ step, the resist is etched five times faster than the second sacrificial layer of tantalum. During ion milling, tantalum is milled twice as fast as carbon, and copper is milled six times as fast as carbon. The $RIE_F$ can use numerous fluorine bases such as SF6, CF4, CHF3. It should also be noted that, with the present method, other materials can be substituted for the copper material layer. Such materials include aluminum, which cannot be frame-plated by the prior art method.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A method of shaping a thin film work piece layer, comprising:

depositing a thin film work piece layer;

depositing a thin film first sacrificial layer of carbon on the work piece layer;

depositing a thin film second sacrificial layer of Ta on the first sacrificial layer; depositing and patterning a photoresist layer on the second sacrificial layer with one or more openings in the photoresist layer exposing one or more exposed portions of the second sacrificial layer;

first reactive ion etching the one or more exposed portions of the second sacrificial layer, until the first sacrificial layer has one or more exposed portions respectively;

second reactive ion etching the one or more exposed portions of the first sacrificial layer, until the work piece layer has one or more exposed portions respectively; and ion beam milling the one or more exposed portions of the work piece layer, until said one or more exposed portions of the work piece layer is removed, leaving a shaped work piece layer.

2. A method as claimed in claim 1, further comprising:

rotating the workpiece and the ion milling relative to one another about a normal to the workpiece layer; and ion milling including directing the ion milling at an angle to said normal.

3. A method as claimed in claim 1, wherein the first reactive ion etching is reactive ion etching with a fluorine base, and the second reactive ion etching is reactive ion etching with an oxygen base.

4. A method as claimed in claim 3, wherein the workpiece layer is Cu.

5. A method as claimed in claim 4, wherein depositing the workpiece layer, depositing the first sacrificial layer and depositing the second sacrificial layer are each by sputter deposition.

6. A method as claimed in claim 5, further comprising:
rotating the workpiece and the ion milling relative to one another about a normal to the workpiece layer; and
ion milling including directing the ion milling at an angle to said normal.

7. A method as claimed in claim 1, wherein depositing the workpiece layer, depositing the first sacrificial layer and depositing the second sacrificial layer are each by sputter deposition.

8. A method as claimed in claim 7, wherein ion beam milling the work piece has a higher ion beam milling rate than an ion beam milling rate of the first sacrificial layer.

9. A method as claimed in claim 8, wherein the second reactive ion etching etches the first sacrificial layer at a higher etch rate than an etch rate of the second sacrificial layer.

10. A method as claimed in claim 9, wherein the second reactive ion etching is reactive ion etching with an oxygen base.

11. A method as claimed in claim 10, wherein the first reactive ion etching is reactive ion etching with a fluorine base.

12. A method as claimed in claim 11, wherein the work piece layer is Cu.

13. A method as claimed in claim 12, further comprising:
rotating the workpiece and the ion milling relative to one another about a normal to the workpiece layer, and
ion milling including directing the ion milling at an angle to said normal.

14. A method of forming a write coil for a write head, comprising:
depositing a thin film coil material layer;
depositing a thin film first sacrificial layer on the coil material layer;
depositing a thin film second sacrificial layer on the first sacrificial layer;
depositing and patterning a photoresist layer on the second sacrificial layer with an opening in the photoresist layer exposing an exposed portion of the second sacrificial layer;
first reactive ion etching the exposed portion of the second sacrificial layer until the first sacrificial layer has an exposed portion;
second reactive ion etching the exposed portion of the first sacrificial layer until the coil material layer has an exposed portion; and
ion beam milling the exposed portion of the coil material layer until the exposed portion of the coil material layer is removed to form said write coil.

15. A method as claimed in claim 14, further comprising:
rotating the coil material layer and the ion milling relative to one another about a normal to the coil material layer; and
ion milling including directing the ion milling at an angle to said normal so that the coil material layer is milled to form a cross section of the coil into a trapezoid.

16. A method as claimed in claim 14, wherein the first sacrificial layer is carbon, and the second sacrificial layer is Ta.

17. A method as claimed in claim 16, wherein the first reactive ion etching is reactive ion etching with a fluorine base, and the second reactive ion etching is reactive ion etching with an oxygen base.

18. A method as claimed in claim 17, wherein the coil material layer is Cu.

19. A method as claimed in claim 18, wherein depositing the workpiece layer, depositing the first sacrificial layer and depositing the second sacrificial layer are each by sputter deposition.

20. A method as claimed in claim 19, further comprising:
rotating the coil material layer and the ion milling relative to one another about a normal to the coil material layer; and
ion milling including directing the ion milling at an angle to said normal so that the coil material layer is milled to form a cross section of the coil into a trapezoid.

21. A method as claimed in claim 14, wherein depositing the workpiece layer, depositing the first sacrificial layer and depositing the second sacrificial layer are each by sputter deposition.

22. A method as claimed in claim 21, wherein ion beam milling the coil material layer has a higher milling rate than a milling rate of the first sacrificial layer.

23. A method as claimed in claim 22, wherein the second reactive ion etching etches the first sacrificial layer at a higher etch rate than an etch rate of the second sacrificial layer.

24. A method as claimed in claim 23, wherein the second reactive ion etching is reactive ion etching with an oxygen base.

25. A method as claimed in claim 24, wherein the first reactive ion etching is reactive ion etching with a fluorine base.

26. A method as claimed in claim 25, wherein the coil material layer is Cu, the first sacrificial layer is carbon, and the second sacrificial layer is Ta.

27. A method as claimed in claim 26, further comprising:
rotating the coil material layer and the ion milling relative to one another about a normal to the coil material layer; and
ion milling including directing the ion milling at an angle to said normal so that the coil material layer is milled to form a cross section of the coil into a trapezoid.

28. A method of making a merged MR head, comprising:
depositing a thin film first shield layer;
depositing a thin film first gap layer on the first shield layer;
depositing a thin film MR sensor and sensor leads on the first gap layer;
depositing a thin film second gap layer on the MR sensor, the sensor leads and the first gap layer;
depositing a thin film second shield and first pole piece layer on the second gap layer;
depositing in unordered steps a thin film gap layer and a first insulation layer on the second shield and first pole piece layer;
forming a write coil on the first insulation layer by:
depositing a thin film coil material layer;
depositing a thin film first sacrificial layer on the coil material layer;
depositing a thin film second sacrificial layer on the first sacrificial layer;
depositing and patterning a photoresist layer on the second sacrificial layer with an opening in the photoresist layer exposing an exposed portion of the second sacrificial layer;

first reactive ion etching the exposed portion of the second sacrificial layer until the first sacrificial layer has an exposed portion;

second reactive ion etching the exposed portion of the first sacrificial layer until the coil material layer has an exposed portion; and ion beam milling the exposed portion of the coil material layer until the exposed portion of the coil material layer is removed to form said write coil;

forming one or more insulation layers on the write coil layer; and depositing a thin film second pole piece on the gap layer and the one or more insulation layers.

29. A method as claimed in claim 28, wherein the first sacrificial layer is carbon, and the second sacrificial layer is Ta.

30. A method as claimed in claim 29, wherein the first reactive ion etching is reactive ion etching with a fluorine base, and the second reactive ion etching is reactive ion etching with an oxygen base.

31. A method as claimed in claim 30, wherein the coil material layer is Cu.

32. A method as claimed in claim 31, wherein depositing the workpiece layer, depositing the first sacrificial layer and depositing the second sacrificial layer are each by sputter deposition.

33. A method as claimed in claim 32, further comprising:

rotating the coil material layer and the ion milling relative to one another about a normal to the coil material layer; and ion milling including directing the ion milling at an angle to said normal so that the coil material layer is milled to form a cross section of the coil into a trapezoid.

34. A method of shaping a thin film work piece layer, comprising:

depositing a thin film work piece layer with a top surface;

depositing a thin film first sacrificial layer on the top surface of the work piece layer with a top surface;

depositing a thin film second sacrificial layer on the top surface of the first sacrificial layer with a top surface;

depositing and patterning a photoresist layer on the top surface of the second sacrificial layer with a top surface and with one or more openings in the top surface of the photoresist layer exposing one or more exposed top surface portions of the second sacrificial layer;

first reactive ion etching the photoresist layer and the one or more exposed portions of the second sacrificial layer, until the first sacrificial layer has one or more exposed top surface portions respectively;

second reactive ion etching the one or more exposed top surface portions of the first sacrificial layer at a faster rate than the exposed top surface portions of the second sacrificial layer until the work piece layer has one or more exposed top surface portions respectively; and ion beam milling the one or more exposed portions of the work piece layer, until said one or more exposed portions of the work piece layer is removed, leaving a shaped work piece layer.

35. A method as claimed in claim 34 including:

continuing said ion milling until said first sacrificial layer is completely removed.

36. A method as claimed in claim 35 including:

continuing the first reactive ion etching until the patterned photoresist layer is completely removed.

37. A method as claimed in claim 36 including:

continuing said ion milling until said first sacrificial layer is completely removed.

* * * * *